United States Patent
Tieken

(12) 
(10) Patent No.: US 6,274,062 B1
(45) Date of Patent: *Aug. 14, 2001

(54) HALOCARBON/HYDROCARBON REFRIGERANT BLEND

(76) Inventor: James B. Tieken, 901 S. 500 West, New Palestine, IN (US) 46163

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/725,936

(22) Filed: Oct. 7, 1996

(51) Int. Cl.$^7$ .................................................... C09K 5/04
(52) U.S. Cl. ................... 252/67; 62/114; 252/68
(58) Field of Search .................... 252/67, 68; 62/114

(56) References Cited

U.S. PATENT DOCUMENTS

| | | | |
|---|---|---|---|
| 3,249,546 | 5/1966 | Eiseman, Jr. | 252/67 |
| 3,251,192 | 5/1966 | Rich, Jr. et al. | 62/58 |
| 3,597,183 | 8/1971 | Murphy et al. | 62/114 |
| 3,723,318 | 3/1973 | Butler | 252/67 |
| 3,936,387 | 2/1976 | Reusser | 252/171 |
| 3,992,167 | 11/1976 | Beddome | 62/18 |
| 4,101,436 | 7/1978 | Murphy et al. | 252/67 |
| 4,157,979 | 6/1979 | Walters | 252/162 |
| 4,174,295 * | 11/1979 | Bargigia et al. | 252/305 |
| 4,261,847 | 4/1981 | Cooper | 252/67 |
| 4,303,536 * | 12/1981 | Orfeo et al. | 252/67 |
| 4,354,955 | 10/1982 | Wittenhorst | 252/305 |
| 4,482,465 * | 11/1984 | Gray | 252/67 |
| 4,810,403 * | 3/1989 | Bivens et al. | 252/67 |
| 4,954,289 | 9/1990 | Bartlett et al. | 252/305 |
| 5,151,207 * | 9/1992 | Goble | 252/67 |
| 5,188,749 * | 2/1993 | Crooker | 252/67 |
| 5,214,929 * | 6/1993 | Goble | 62/114 |
| 5,543,071 * | 8/1996 | Basile et al. | 252/67 |

FOREIGN PATENT DOCUMENTS

| | | |
|---|---|---|
| 0105831 * | 4/1984 | (EP) . |
| 2228739 * | 9/1990 | (GB) . |
| 3168262 | 7/1991 | (JP) . |
| 3276052 | 12/1991 | (JP) . |

OTHER PUBLICATIONS

European Patent Application Publication No. EP 0 404 086 A2, published Dec. 27, 1990, Bulletin 90/52.

* cited by examiner

*Primary Examiner*—Margaret Einsmann
(74) *Attorney, Agent, or Firm*—Brinks Hofer Gilson & Lione

(57) ABSTRACT

A refrigerant composition for use as a direct replacement for R-12. The refrigerant composition comprises about 40 to 60 weight percent chlorodifluoromethane (R-22), about 30 to 50 weight percent 1-chloro-1,2,2,2-tetrafluoroethane (R-124), about 5 to 20 weight percent 1-chloro-1,1-difluoroethane (R-142b), and about 1 to 4 weight percent of a hydrocarbon component, such as isobutane (R-600a).

8 Claims, No Drawings

HALOCARBON/HYDROCARBON REFRIGERANT BLEND

BACKGROUND OF THE INVENTION

This invention relates generally to refrigerants, and more particularly to a halocarbon/hydrocarbon refrigerant blend.

Refrigeration systems have been in widespread use for decades. These systems have a wide variety of uses, such as comfort cooling, household refrigeration, automobile air conditioning, commercial freezer cooling, and the like. Such systems work on the basic premise that a fluid, known as a refrigerant, picks up heat from an area to be refrigerated, and disposes of the heat in an area not affected by an increase in heat.

Refrigeration processes are well known in the art. Typically, such processes encompass a changing state of the fluid from a liquid to a vapor, and vapor to liquid, which change of state allows for the rapid removal of heat from the area to be refrigerated. Different types of refrigeration systems use different refrigerants having properties designed to enable the given system to approach maximum performance.

R-12 (dichlorodifluormethane) has long been the refrigerant of choice for uses ranging from domestic and commercial refrigeration, to automobile air conditioners. However, the international community has now come to recognize that chlorofluorocarbon refrigerants (CFC's), such as R-12, have an adverse effect on the earth's protective ozone layer. International agreements, such as the Montreal Protocol, have called for a phase out of these CFC's. As a result, the scientific community faced the task of developing suitable replacements for those CFC's. To date, much time and effort has been expended to find such suitable replacements.

Several low ozone-depleting refrigerants have been promoted as replacements for CFC refrigerants. Perhaps the most widely used replacement refrigerant is 1,1,1,2-tetrafluoroethane (R-134a). Nearly all new automobile air conditioners, fresh food storage compartments and like devices are now being manufactured to use R-134a as the refrigerating fluid. R-134a is non-ozone-depleting, non-flammable and nontoxic. However, the use of R-134a necessitates major changes in most refrigeration systems. For example, the naphthenic lubricating oils typically used with R-12 are not compatible with R-134a. Thus, it is necessary to completely drain these oils from systems previously using R-12, and replace the oil with an oil more compatible with R-134a. In addition, some equipment used in existing air conditioning systems, such as the hoses used in automobile air conditioning systems, is not compatible with R-134a, thus necessitating significant overhaul and replacement of portions of these air conditioning systems. A further drawback to the use of R-134a as a replacement for R-12 is that the thermodynamic properties of R-134a are generally inferior to those of R-12. As a result, refrigeration systems using R-134a require more electrical consumption. In addition, in order to obtain the same level of cooling in an automobile air conditioning system using R-134a when compared to a system using R-12, the additional work required of the engine with the R-134a reduces the gas mileage compared to that obtained in an otherwise similar automobile under similar conditions, but utilizing R-12 refrigerant.

Several refrigerant blends have also been promoted as substitutes for R-12. A ternary halocarbon blend consisting essentially of R-22, R-124 and R-142b is described in U.S. Pat. No. 5,188,749. A ternary halocarbon blend of R-22, R-114 and R-152a is described in U.S. Pat. No. 4,810,403. However, use of the blended compositions described in these patents requires that the oil normally found in an existing refrigeration system be replaced with an oil specifically designed for use with that refrigerant blend, due to the immiscibility of the oil normally used in the refrigeration systems with the replacement refrigerant. In addition, even when the replacement oil is used, the temperature range in which the oil is miscible with the refrigerant may be narrower than that when R-12 is used. As a result, these blends are generally only useful in applications where the operating temperatures are within these, sometimes narrow, ranges of miscibility. If the particular refrigeration application includes operating temperatures outside the range of miscibility of the particular oil in the refrigerant, the compressor may become damaged due to insufficient lubrication.

U.S. Pat. No. 4,482,465 teaches blends of halocarbon/hydrocarbon refrigerants, and provides direction how to blend these refrigerants to provide a composition having reduced flammability. However, this patent does not address the issue of oil miscibility.

U.S. Pat. No. 5,151,207 teaches a blend of the halocarbons R-22 and R-142b, with the addition of a minor hydrocarbon component, in this case isobutane. Although this refrigerant blend is miscible with oils commonly found in refrigeration systems, the use of relatively large amounts of the flammable halocarbon R-142b in connection with the hydrocarbon isobutane may cause the refrigerant blend to become weakly flammable if about sixty percent or more of the blend leaks from a refrigeration system or container. The flammability of this refrigerant presently precludes its use in automobile air conditioning systems.

Accordingly, a need exists for a refrigerant that may be employed as a direct replacement for CFC's such as R-12. The replacement refrigerant should be compatible with existing refrigerant equipment, and miscible with lubricating oils presently used in such equipment throughout a wide range of operating temperatures. In addition, the replacement refrigerant should be nonflammable, not only as manufactured but also after significant refrigerant loss has occurred from the system due to system damage or system component failure. Further, the refrigerant composition should have thermodynamic properties comparable to R-12.

SUMMARY OF THE INVENTION

This problem is solved with the refrigerant of the present invention. The present invention comprises a replacement refrigerant for CFC's such as R-12, and a method for producing refrigeration using the replacement refrigerant.

In one form thereof, the present invention comprises a refrigerant composition for use as a direct replacement for dichlorodifluoromethane (R-12). The refrigerant composition comprises about 40 to 60 weight percent chlorodifluoromethane (R-22), about 30 to 50 weight percent 1-chloro-1,2,2,2-tetrafluoroethane (R-124), about 5 to 20 weight percent 1-chloro-1,1-difluoroethane (R-142b), and about 1 to 4 weight percent of a hydrocarbon, such as isobutane (R-600a).

In another form thereof, the present invention comprises a method for producing refrigeration in a refrigeration system. The method comprises employing as a refrigerant in the refrigeration system a composition comprising about 40 to about 60 weight percent chlorodifluoromethane (R-22), about 30 to about 50 weight percent 1-chloro-1,2,2,2-tetrafluoroethane (R-124), about 5 to about 20 weight percent 1-chloro-1,1-difluoroethane (R-142b), and about 1 to about 4 weight percent isobutane (R-600a).

DETAILED DESCRIPTION OF THE INVENTION

The present invention provides a novel refrigerant composition for use in refrigeration systems. The refrigerant may be used as a substitute for environmentally harmful CFC's such as dichlorodifluoromethane (R-12). The novel refrigerant composition has thermodynamic properties comparable to R-12, and is miscible with refrigeration system lubricating oils over a wide range of possible operating temperatures. In addition, the inventive composition is nonflammable, not only as manufactured and installed into the refrigeration system, but also after significant refrigerant loss has occurred from the system.

In order to operate effectively and to prevent system damage, the compressor lubricating oil must be carried by the refrigerant through the refrigeration system for return to the compressor. In order to be carried through the system, the compressor oil should dissolve in, or be miscible with, the refrigerant. The oil should remain miscible with the refrigerant when the oil and refrigerant pass through all parts of the refrigeration system, including the evaporator, which is the coldest part of the refrigeration system. The evaporator is the portion of a refrigeration system where boiling of the refrigerant and significant heat transfer occur. If the oil separates from the refrigerant in the evaporator, the oil will generally remain at that point and not travel further through the system. Since the oil has separated from the refrigerant, the refrigerant does not thereafter include adequate lubricant as it passes through the compressor to protect the compressor from damage. As a result, the compressor will likely be damaged due to insufficient lubrication.

Owing to the presence of the small amount of the hydrocarbon, the refrigerant of the present invention remains miscible with the lubricating oil over a wide range of operating temperatures. As a result, the refrigerant may be used not only in relatively high-temperature systems such as motor vehicle air conditioners, water coolers, dehumidifiers, and produce and dairy supply cases, which operate at temperatures between about 40° F. and 5° F., but also in low-temperature applications such as ice cream display cases, blood storage facilities and residential freezers, which operate at temperatures between about 5° F. and −40° F.

In order to operate at the low temperatures cited above and at the same time prevent damage to the system, it is essential that the oil remain miscible with the refrigerant. The addition of the small amount of hydrocarbon to the refrigerant blend dramatically lowers the temperature at which the lubricating oil will remain miscible with the refrigerant when compared to similar blends not including the hydrocarbon component. For example, the addition of as little as two percent isobutane to a halocarbon blend of R-22/R-124/R-142b enables the oil to remain miscible with the refrigerant at temperatures as low as −20° F.

Although isobutane (R-600a) is the preferred hydrocarbon, other common hydrocarbon refrigerants having low numbers of carbon atoms such as propane, butane, ethylene, propylene, pentane and isopentane may similarly be used at about the same percentages described for isobutane.

Two types of tests were conducted to test the miscibility of the refrigerants in question with different types of refrigeration oils. These tests are described below:

EXAMPLE 1

The first test utilized a small clear chamber through which the refrigerants could be observed. Different refrigerants and oils were mixed and cooled until the oil and refrigerant separated. The point at which the oil and refrigerant separates is referred to as the point of critical oil miscibility. The results are shown in Table One.

As demonstrated by this test a small amount of the hydrocarbon isobutane in the blend of refrigerants reduced the critical oil miscibility to a point that the refrigerant having the small amount of isobutane could be used in refrigeration equipment at operating temperatures much lower than a similar refrigerant not including the isobutane component.

TABLE ONE

| Refrigerant | Critical oil miscibility with Suniso 3GS Ref. Oil 10% oil/90% refrigerant | Critical oil miscibility with Sunisco 3GS Ref. Oil 20% oil/80% refrigerant | Critical oil miscibility with Sunisco 3GS Ref. Oil 50% oil/50% refrigerant |
|---|---|---|---|
| R-22 | 19 Deg. F. | 22 Deg. F. | 37 Deg. F. |
| R-124 | 37 Deg. F. | 44 Deg. F. | 59 Deg. F. |
| R-142b | 8 Deg. F. | 10 Deg. F. | 17 Deg. F. |
| R-22/R-124/R-142b 50/40/10 | 21 Deg. F. | 25 Deg. F. | 37 Deg. F. |
| R-22/R-124/R-142b/Isobutane 49/39/9/3 | −29 Deg. F. | −12 Deg. F. | 4 Deg. F. |

EXAMPLE 2

The second test involved the actual operation of refrigeration equipment. Two pieces of identical freezer equipment were used, each equipped with a top mounted condensing unit. The design operation temperature of the units was 0° F. Unit two was charged with a 50/40/10 blend of R-22/R-124/R-142b. Unit one was charged with the same halocarbon blend including 2% isobutane (R-600a). Compressor dome temperatures (° F.), interior freezer (i.e., "box") temperatures (° F.), compressor amperage, and operating pressures were recorded at six-hour intervals. At the completion of the test, the compressors were opened and examined for wear and damage. The results of this test are in Table Two.

Upon opening the compressors, the first compressor (Unit #1) was clean with no apparent wear caused by lack of lubrication. The second compressor (Unit #2) contained less than one ounce of oil. The piston walls were scarred and black, and the pistons showed signs of lack of lubrication. The evaporators of both units were removed, and the oil was removed from them. The evaporator of Unit #1 had 1½ ounces of oil in it, and the evaporator of Unit #2 had 7 ounces of oil in it, indicating that a large portion of the oil had separated from the refrigerant in the evaporator, and did not travel further through the system with the refrigerant. It was apparent from this test that the addition of the small percentage of isobutane increased oil miscibility enough to return oil to the compressor in Unit #1 for lubrication. Unit #2 without the added hydrocarbon refrigerant failed because of a lack of lubrication.

TABLE TWO

| | Unit #1 | | | | Unit #2 | | | |
|---|---|---|---|---|---|---|---|---|
| Hours | Comp. Temp. | Amperage | Box Temp. | Amb. Temp. | Comp. Temp. | Amperage | Box Temp. | Amb. Temp. |
| 6 | 113 | 6.4 | 4 | 77 | 110 | 6.4 | 3 | 77 |
| 12 | 114 | 6.6 | −1 | 75 | 114 | 6.4 | −1 | 75 |
| 18 | 112 | 6.3 | 0 | 69 | 115 | 6.3 | 2 | 69 |
| 24 | 115 | 6.5 | −1 | 70 | 115 | 6.7 | 0 | 70 |
| 30 | 117 | 6.6 | −2 | 80 | 113 | 6.8 | 0 | 80 |
| 35 | 121 | 6.7 | −1 | 84 | 117 | 6.7 | −2 | 84 |
| 42 | 118 | 6.3 | 3 | 70 | 120 | 7 | 2 | 70 |
| 48 | 126 | 6.2 | 2 | 77 | 125 | 7.1 | 1 | 77 |
| 56 | 121 | 6.5 | 0 | 75 | 127 | 7.1 | 2 | 75 |
| 60 | 122 | 6.5 | −2 | 79 | 122 | 7 | −2 | 79 |
| 66 | 112 | 6.4 | −1 | 71 | 130 | 7.3 | 1 | 71 |
| 72 | 122 | 6.7 | −2 | 77 | 131 | 7.4 | 1 | 77 |
| 78 | 124 | 6.8 | −4 | 82 | 133 | 6.9 | 2 | 82 |
| 84 | 130 | 6.5 | 1 | 88 | 140 | 7.6 | 4 | 88 |
| 90 | 119 | 6.1 | 0 | 73 | 141 | 7.7 | 5 | 73 |
| 96 | 120 | 6.4 | 1 | 80 | 138 | 7.5 | 2 | 80 |
| 102 | 123 | 6.5 | −2 | 81 | 150 | 7.4 | 12 | 81 |
| 108 | 120 | 6.3 | −1 | 77 | 177 | 8 | 13 | 77 |
| 114 | 110 | 6.8 | 0 | 69 | 164 | 7.9 | 20 | 69 |
| 120 | 118 | 6.4 | 0 | 73 | Compressor failure - locked up | | | |
| 126 | 120 | 6.5 | 0 | 77 | | | | |
| 132 | 120 | 6.7 | 1 | 79 | | | | |
| 138 | 11S | 6.9 | −3 | 70 | | | | |
| 144 | 119 | 6.5 | 0 | 74 | | | | |
| 1SO | 121 | 6.4 | −2 | 77 | | | | |
| 156 | 120 | 6.3 | 4 | 78 | | | | |
| 162 | 118 | 6.6 | 0 | 71 | | | | |
| 168 | 130 | 6.2 | −1 | 80 | | | | |
| 174 | 131 | 6.2 | 0 | 83 | | | | |
| 180 | 133 | 6.4 | −3 | 88 | | | | |
| 186 | 123 | 6.5 | 2 | 75 | | | | |
| 192 | 125 | 6.6 | −1 | 81 | | | | |

Although it has been demonstrated that the addition of the hydrocarbon to the blend of halocarbon refrigerants dramatically lowers the range of operating temperatures, it must be recognized that hydrocarbons are flammable substances. In addition, one of the halocarbon components of the inventive refrigerant composition, namely 1-chloro-1,1-difluoroethane (R-142a), is also flammable. Thus, a blend including these components must be formulated in a manner such that the blend is nonflammable. However, formulation of a nonflammable blend for use in a refrigeration system is more complex than merely selecting an initial composition that is nonflammable.

Even if the initial blend is nonflammable, there is still a possibility that the refrigerant may later become flammable during actual operation of the refrigerating system. Thus, merely determining that the initial blend is nonflammable does not insure that flammability problems may not later arise. For example, if a leak develops in the system, or if damage otherwise occurs to the system, some of the refrigerant may escape in the form of vapor. In non-azeotropic refrigerant blends such as the inventive blend, one or more of the components will leak out of the system at a faster rate than other components, resulting in a fractionation of the components. As a result, the balance of the components is altered. It is possible that the concentration of the flammable component in the escaping vapor can become high enough for that vapor to reach the flammability limit. Similarly, if the nonflammable component is the one leaking from the system, it is possible that the concentration of the flammable component in the remaining refrigerant will increase sufficiently to cause that remaining refrigerant become flammable.

Accordingly, it is very important that the percentages of the various components in the formulation are selected such that neither the percentages of the flammable components in the escaping vapor, nor the percentages of flammable components in the remaining refrigerant, concentrate to an extent during leakage such that the flammability limit of the vapor or refrigerant is reached. It has been determined that a blend of about 40 to 60 weight percent chlorodifluoromethane (R-22), about 30 to 50 weight percent 1-chloro-1,2,2,2-tetrafluoroethane (R-124), about 5 to 20 weight percent 1-chloro-1,1-difluoroethane (R-142b), and about 1 to 4 weight percent isobutane (R-600a) is nonflammable not only in the initial refrigerant blend, but also after 99% of the refrigerant evaporates from the system. In the inventive blend, the two major components, namely R-22 and R-124 are both nonflammable. The two minor components, R-142b and the hydrocarbon, are flammable. However, when these components are blended in the composition of the present invention, both the refrigerant as well as the escaping vapor are nonflammable.

During leakage of refrigerant vapor, the components of a nonazeotropic blend fractionate, that is, they escape at different rates. In order to determine the fractionation behavior of a blend of the components referenced above, vapor leak tests were conducted on the preferred composition of the inventive refrigerant formulated as follows: 50% R-22, 39% R-124, 1.5% R-600a, and 9.5% R-142b. The experimental process is described in the following example:

EXAMPLE 3

The change in composition of the starting blend of R-22/R-124/R-600a/R-142b (50/39/1.5/9.5), was measured during leaks of pure vapor under equilibrium conditions at three different temperatures, namely −24° C.(−11° F.), 25° C.(77° F.), and 55° C. (131° F.). Separate tests were performed at each of the three temperatures on samples taken from a steel cylinder which was 90% filled with the starting blend. The tests were repeated on samples taken from a cylinder which was 15% filled. Thus, a total of six tests were performed.

The steel cylinders had a water capacity of 26.2 pounds. For each test, a cleaned cylinder was evacuated to 200 microns, and weighed to determine tare weight. A known amount of the highest boiling component was first added to the cylinder (R-142b, b.pt. 14.4° F., −9.2° C.), followed by the next highest boiling component, (R-600a, b.pt 10.9° F., −11.8° C.) and so on (R-124, b.pt 8.3° F., −12° C., and R-22, b.pt. −41.4° F., −40.8° C.). The weight measurements were obtained by using a certified electronic scale calibrated to measure in 0.002 pound increments. The cylinders were rolled for 15 minutes to mix the components.

The cylinders were each placed in a thermostatically controlled temperature bath. The cylinders were equipped with liquid/vapor valves for ease of liquid removal. Due to the large refrigerant sample being tested, vapor could be bled out of the liquid tube until liquid was present during sampling without jeopardizing the integrity of the test results. After the cylinder reached the desired test temperature, a capillary tube with sampling port and bubbler was attached to the vapor port. Leak rate was varied by a needle valve between the sampling port and the tank valve. Leak rate was maintained at 2% of total refrigerant beginning weight per hour. The first samples were taken after 2% had leaked out, and then at 10 weight percent intervals until only vapor remained in the cylinder, or until the remaining composition had reached atmospheric pressure, whichever came first.

The samples were removed with a gas tight syringe equipped with a closure valve to trap sample in the syringe. The samples were then analyzed using a SRI 8610 gas chromatograph equipped with a AT-1000 packed column, to provide the percentage of each of the fractionated components during all phases of the leakout. As a result, the "worst case" fractionated percentage of the flammable components could be determined. The "worst case" fractionated percentage is the highest percentage that a particular component ever reaches, regardless of whether this "worst case" percentage occurs in a vapor leak-out sample or a sample of the remaining liquid refrigerant. With reference to R-600a, it was found that the "worst case" fractionation percentage of this component was 1.84%. In other words, in all of the samples tested, the percentage of R-600a never exceeded 1.84%, regardless of whether the R-600a was found in a vapor or liquid refrigerant sample, and regardless of how much vapor had leaked from the system. Similarly, with reference to R-142b, it was found that the "worst case" fractionation percentage of this component was 21.13%.

Flammability tests were then conducted to determine the flammability potential of a refrigerant blend of R-22/R-124/R-600a/R-142b. The flammability tests were conducted to determine the flammability potential of not only the preferred formulation, R-22/R-124/R-600a/R-142b (50/39/1.5/9.5), but also certain worst case fractionated compositions, or near worst case compositions. In addition, a "mid-point" fractionated blend was tested. This "mid-point" fractionated blend was estimated to reflect the composition of a remaining refrigerant after roughly 50% of the formulation had leaked out at 25° C.

EXAMPLE 4

The flammability data was obtained using the procedure and apparatus described in ASTM-E-681, except that the procedure was modified by substituting a magnetically driven agitator for the stirring bar. In addition, a wooden safety match head was used as the ignition source. The match head was secured and heated to ignition with an electrically energized nichrome wire secured across the electrodes. All tests were conducted at room temperature and atmospheric pressure and humidity. Gas mixtures were prepared by the partial pressure method. The vessel was partially evacuated, and an electronic vacuum gauge was used to measure pressure changes upon addition of the gas to be tested into the test vessel. The pressure in the vessel was then raised to atmospheric pressure by admitting air. The concentration of fuel (refrigerant) and air is reported in volume percent, which is calculated by dividing the partial pressure of each component by the test pressure.

The stirrers were actuated and allowed to mix the components for about 10 minutes, which was considered a reasonable period of time. The igniter was then discharged and visual observation of the flame noted. After each test the vessel was evacuated and purged with air three times. The ignition assembly was cleaned or replaced as required.

The criteria used to assign a flammable result to a test were the same as those currently being followed by Underwriters Laboratories Inc. and others in determining flammability. The flame must reach the walls of the flask, be outside the neck of the flask, and be wider than the neck.

The tests were performed with the formulations designated A, B, C and D as defined below.

| TEST # | # REFRIG. | A RESULT | B RESULT | C RESULT | D RESULT |
|---|---|---|---|---|---|
| 1 | 6 | nonfl. | nonfl. | nonfl. | nonfl. |
| 2 | 7 | nonfl. | nonfl. | nonfl. | nonfl. |
| 3 | 8 | nonfl. | nonfl. | nonfl. | nonfl. |
| 4 | 10 | nonfl. | nonfl. | nonfl. | nonfl. |
| 5 | 11 | nonfl. | nonfl. | nonfl. | nonfl. |
| 6 | 12 | nonfl. | nonfl. | nonfl. | nonfl. |
| 7 | 13 | nonfl. | nonfl. | nonfl. | nonfl. |
| 8 | 14 | nonfl. | nonfl. | nonfl. | nonfl. |
| 9 | 15 | nonfl. | nonfl. | nonfl. | nonfl. |
| 10 | 16 | nonfl. | nonfl. | nonfl. | nonfl. |
| 11 | 17 | nonfl. | nonfl. | nonfl. | nonfl. |
| 12 | 18 | nonfl. | nonfl. | nonfl. | nonfl. |
| 13 | 19 | nonfl. | nonfl. | nonfl. | nonfl. |
| 14 | 20 | nonfl. | nonfl. | nonfl. | nonfl. |
| 15 | 25 | nonfl. | nonfl. | nonfl. | nonfl. |
| 16 | 30 | nonfl. | nonfl. | nonfl. | nonfl. |

A ASTM-E-681 test results "Preferred Formulation" 22/124/600a/142b (50/39/1.5/9.5)
B ASTM-E-681 test results "Near Worst Fractionated Highest Percentage R-600a 22/124/600a/142b (70.43/23.42/1.77/4.38)
C ASTM-E-681 test results "Worst Case Fractionated Highest Percentage R-142b" 22/124/600a/142b (5.81/72.44/.62/21.13)
D ASTM-E-681 test results "Midpoint Fractionated Blend" 22/124/600a/142b (19.59/63.05/1.09/16.27)

The results of these flammability tests confirm that the inventive blend of refrigerants is nonflammable at each of the formulations tested. Due to a reporting error, the "Near Worst Case Fractionated Percentage R-600a" was tested instead of the "Worst Case Fractionated Percentage" described above, such that the percentage of R-600a in the tested sample was 1.77, rather than 1.84.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A refrigerant composition comprising about 40 to 60 weight percent chlorodifluoromethane (R-22), about 30 to 50 weight percent 1-chloro-1,2,2,2-tetrafluoroethane (R-124), about 5 to 20 weight percent 1-chloro-1,1-difluoroethane (R-142b), and about 1 to 3 weight percent of a hydrocarbon selected from the group consisting of isobutane, propane, butane, pentane, isopentane, ethylene and propylene.

2. The refrigerant composition of claim 1, wherein the hydrocarbon is isobutane (R-600a).

3. A refrigeration composition consisting essentially of, by weight, about 50 percent chlorodifluoromethane (R-22), about 39 percent 1-chioro-1,2,2,2-tatrafluoroethane (R-124), about 9.5 percent 1-chloro-1,1-difluoroethane (R-142b), and about 1.5 percent isobutane (R-600a).

4. A refrigerant composition comprising about 45 to 55 weight percent chlorodifluoromethane (R-22), about 35 to 45 weight percent 1-chloro-1,2,2,2-tetrafluoroethane (R-124), about 5 to 15 weight percent 1-chloro-1,1-difluoroethane (R-142b), and about 1 to 2 weight percent isobutane (R-600a).

5. The refrigerant composition of claim 4 comprising about 50 weight percent chlorodifluoromethane (R-22), about 39 weight percent 1-chloro-1,2,2,2-tetrafluoroethane (R-124), about 9.5 weight percent 1-chloro-1,1-difluoroethane (R142b), and about 1.5 weight percent isobutane (R-600a).

6. A method for producing refrigeration in a refrigeration system comprising employing as a refrigerant a composition comprising about 40 to about 60 weight percent chlorodifluoromethane (R-22), about 30 to about 50 weight percent 1-chloro-1,2,2,2-tetrafluoroethane (R-124), about 5 to about 20 weight percent 1-chloro-1,1-difluoroethane (R-142b), and about 1 to about 3 weight percent isobutane (R-600a).

7. The method of claim 6, wherein said refrigerant composition comprises about 50 weight percent chlorodifluoromethane (R-22), about 39 weight percent 1-chloro-1,2,2,2-tetrafluoroethane (R-124), about 9.5 weight percent 1-chloro-1,1-difluoroethane (R-142b), and about 1.5 weight percent isobutane (R-600a).

8. The method of claim 6, wherein said refrigerant composition comprises abot 45 to about 55 weight percent chlorodifluoromethane (R-22), about 35 to 45 weight percent 1-chloro-1,2,2,2-tetrafluoroethane (R-124), about 5 to 15 weight percent 1-chloro-1,1-difluoroethane (R-142b), and about 1 to 2 weight percent isobutane (R-600a).

* * * * *